May 20, 1930. F. H. PARKER 1,759,587
SAUSAGE STUFFING AND LINKING MACHINE
Filed Nov. 18, 1927 5 Sheets-Sheet 1
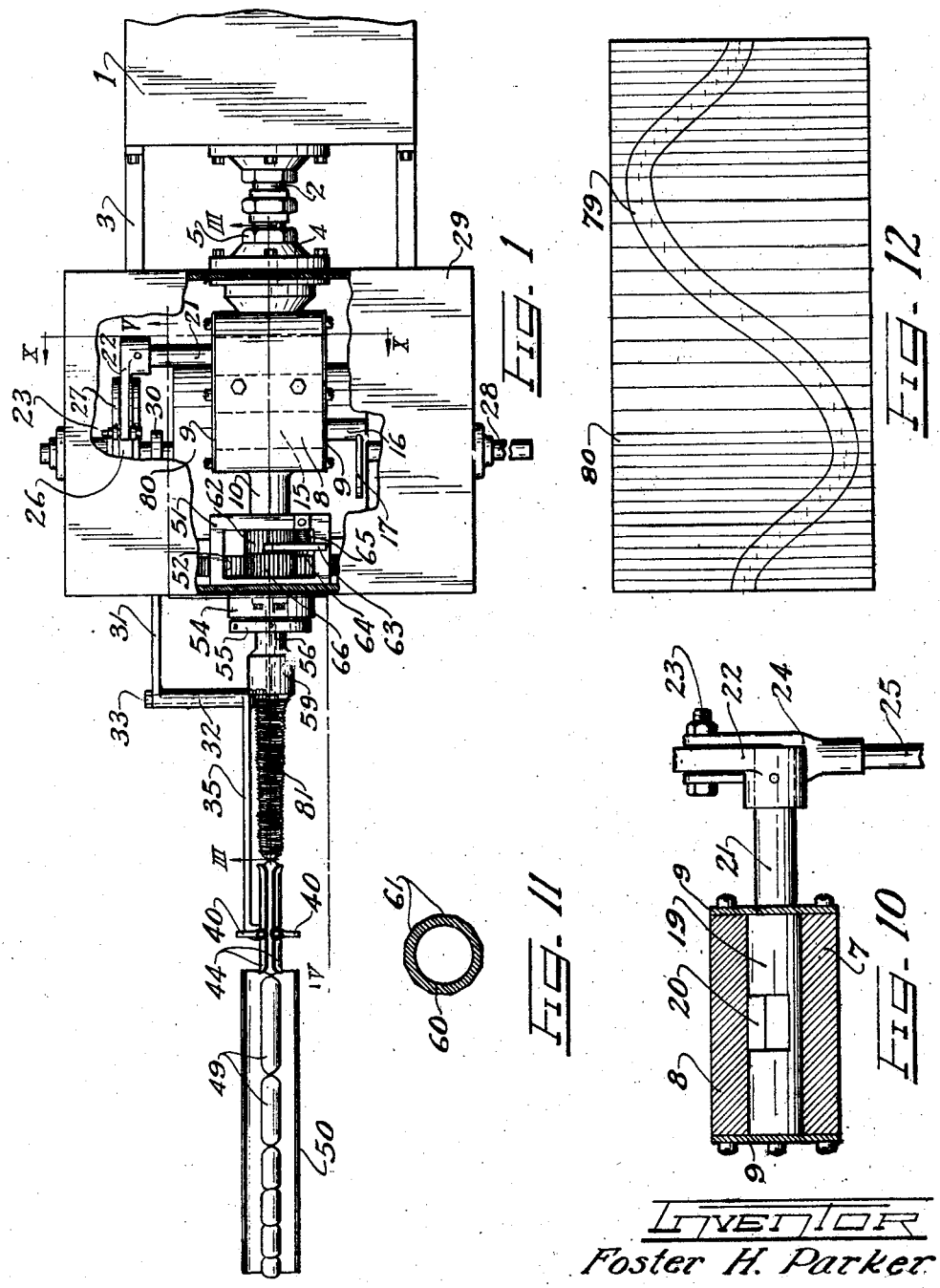
INVENTOR
Foster H. Parker
by Charles W. Hills
Attys.

May 20, 1930. F. H. PARKER 1,759,587
SAUSAGE STUFFING AND LINKING MACHINE
Filed Nov. 18, 1927 5 Sheets-Sheet 2
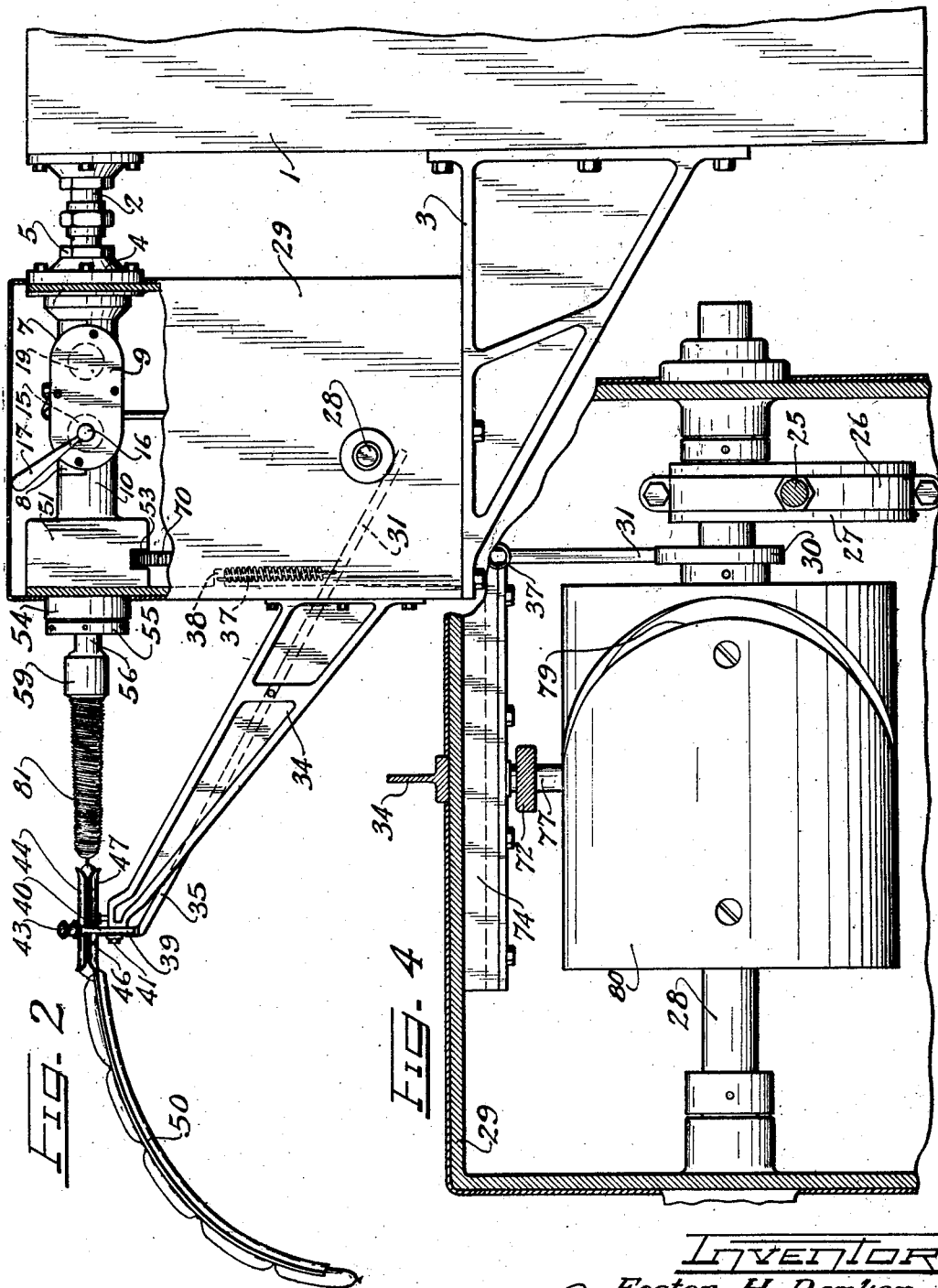
Inventor
Foster H. Parker
By Charles W. Hill Attys

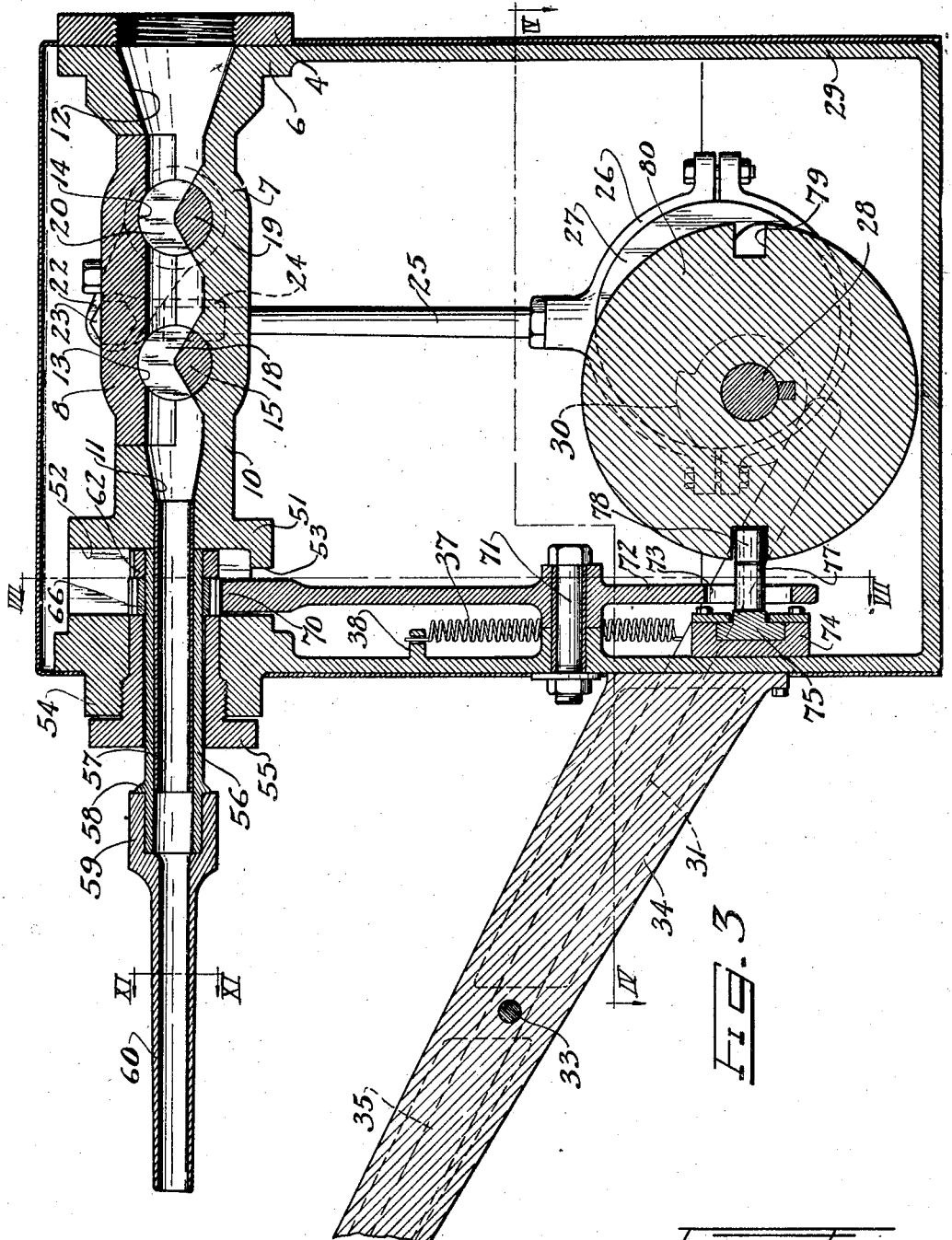

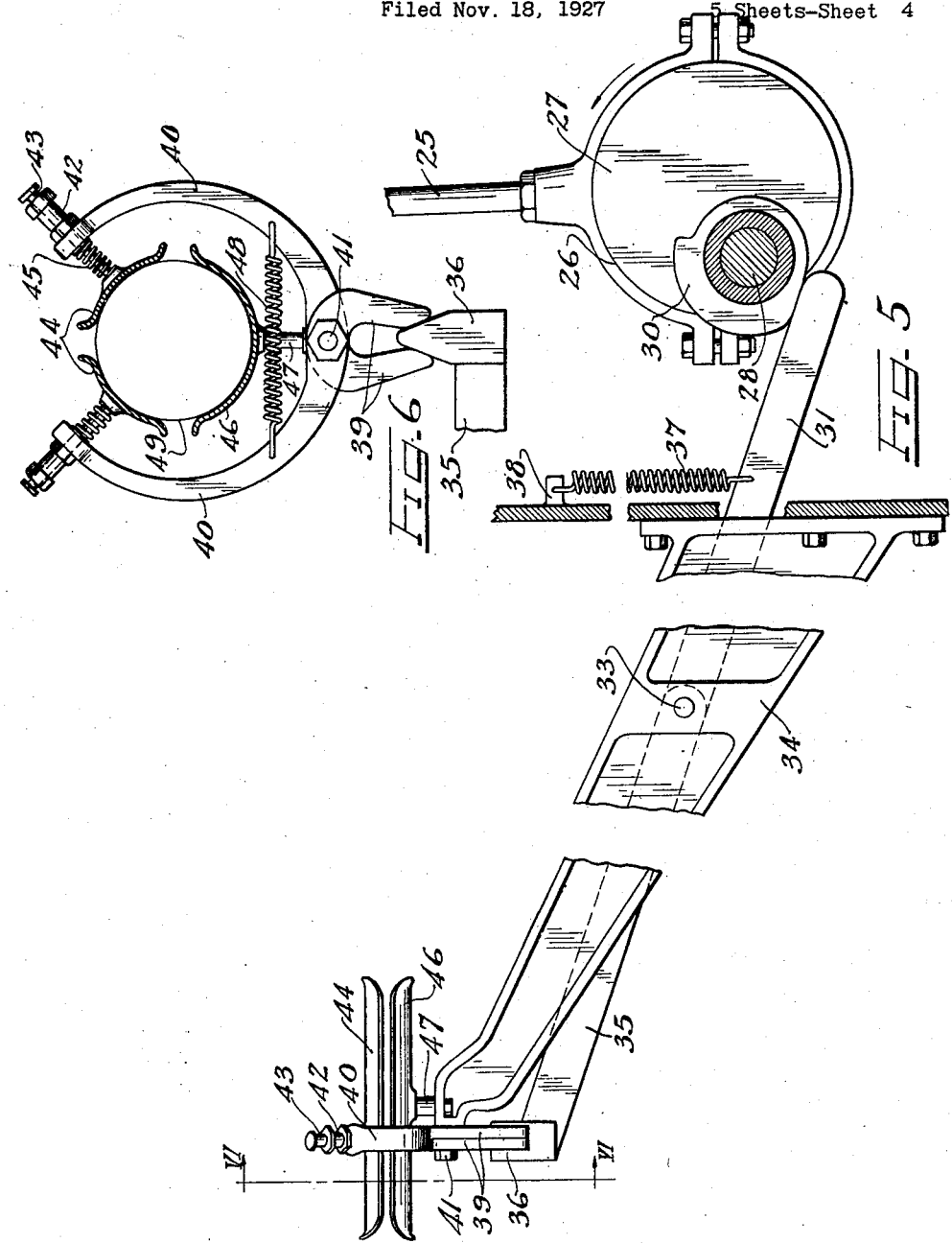

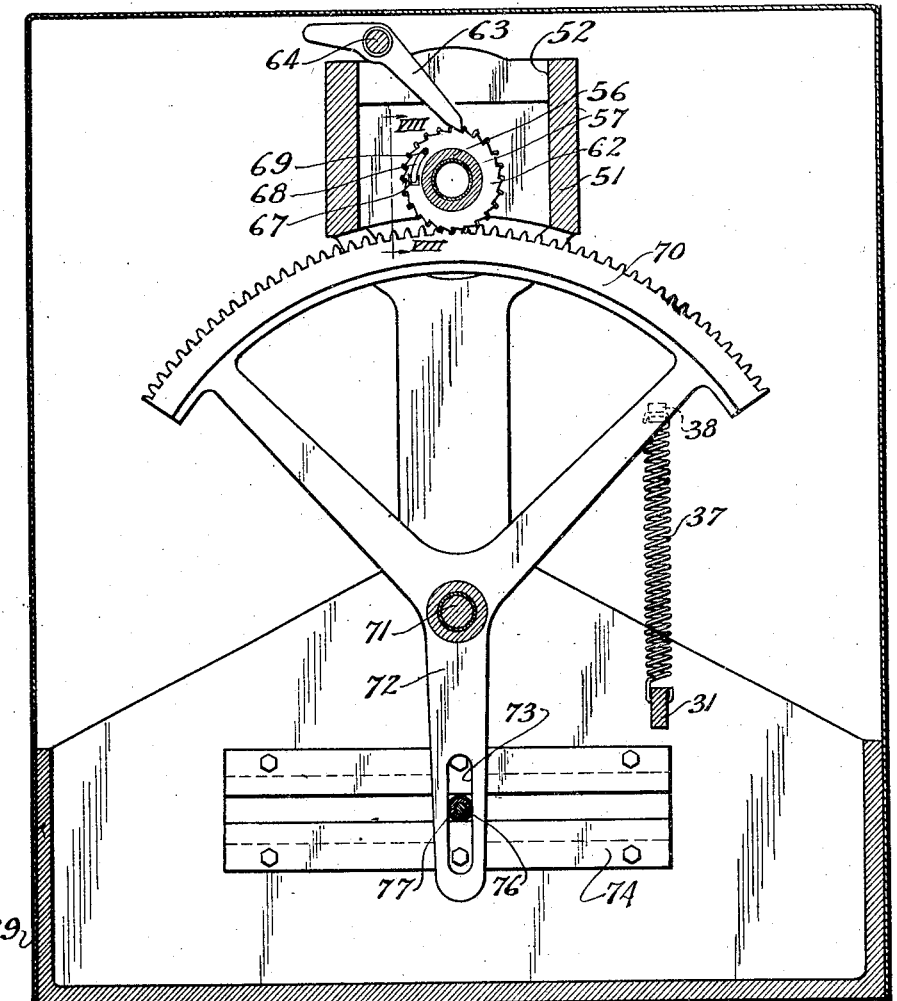
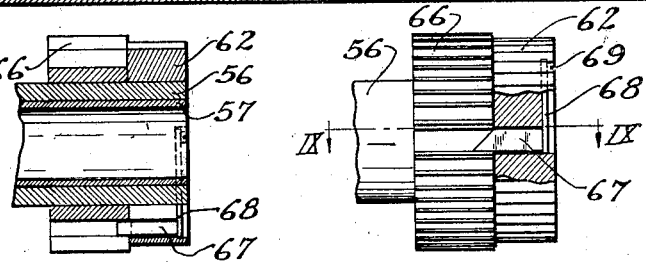

Patented May 20, 1930

1,759,587

UNITED STATES PATENT OFFICE

FOSTER H. PARKER, OF CHICAGO, ILLINOIS

SAUSAGE STUFFING AND LINKING MACHINE

Application filed November 18, 1927. Serial No. 234,065.

This invention relates to an improved and simplified form of a sausage stuffing and linking machine adapted to be connected with a compressed air sausage meat supply tank, for the purpose of automatically filling intestines or sausage casings, filled sections of which are adapted to be individually held against rotation while the unfilled section of the sausage casing is automatically rotated at predetermined times to cause twisting of a portion of the casing adjacent the end of a filled section, thereby gradually producing a chain of linked sausages of substantially equal size.

It is an object of this invention to provide an improved machine adapted to automatically fill and link sausage casings.

It is also an object of this invention to provide a simplified machine adapted to be readily attached to a sausage meat supply container and furthermore adapted to temporarily hold a filled section of the casing against rotation while the entire remaining unfilled section of the casing is rotated to complete the forming of a sausage.

It is a further object of this invention to provide a sausage linking machine adapted to be readily supported on and connected with a sausage meat supply tank, whereby sausage meat is adapted to be fed under pressure into intestines or sausage casings, removably engaged on a nozzle, adapted to be automatically rotated at predetermined intervals after filling operations of the casing to cause twisting of certain portions of the casing, thereby forming a link or chain of sausages adapted to be discharged from the machine over a delivery trough or the like.

Another object of this invention is to provide a sausage linking machine wherein the filling mechanisms and the casing twisting mechanisms are adapted to be automatically controlled by cam means.

It is furthermore an object of this invention to provide a sausage linking machine wherein sausage clamping mechanisms are adapted to be automatically closed by spring means at a predetermined time to engage and resiliently hold a stuffed section of a sausage casing during the time the unstuffed portion of the casing is rotated, to twist the end of the filled section to produce a sausage, from which the clamping mechanisms are adapted to be automatically released by cam-controlled means to permit the formed sausage to be advanced toward discharge position as an additional portion of the casing is being filled.

It is an important object of this invention to provide a sausage linking machine of simplified and compact form, adapted to be readily supported on the exterior of a sausage meat supply tank and connected to the outlet pipe of said tank so that sausage meat may be automatically fed at predetermined times into a sausage casing, the filled section of which is adapted to be temporarily held against rotation while the unfilled portion of the casing is rotated a selected number of times to cause the portion of the casing adjacent the filled section to be twisted to complete the forming of a sausage, which is automatically released by the holding mechanism and moved into a discharge trough with the filling of an additional section of the casing as it is moved off of a filling nozzle, due to the pressure caused by an additional supply of sausage meat forced from the supply container.

Other and further important objects of this invention will be apparent from the disclosures in the specification and the accompanying drawings.

This invention (in a preferred form) is illustrated in the drawings and hereinafter more fully described.

On the drawings:

Figure 1 is a top plan view with parts broken away of a sausage stuffing and linking machine embodying the principles of this invention and shown connected to a fragmentary portion of a sausage meat supply container.

Figure 2 is a side elevation of the machine with a part of the housing broken away to show portions of the interior of the machine.

Figure 3 is an enlarged longitudinal fragmentary detail section of the machine taken on line III—III of Figure 1.

Figure 4 is a horizontal section taken through the lower portion of the machine on line IV—IV of Figure 3.

Figure 5 is an enlarged vertical elevational view of the sausage clamping mechanism and the control therefor, taken on line V—V of Figure 1.

Figure 6 is an enlarged vertical sectional view of the sausage clamping mechanism, taken on line VI—VI of Figure 5.

Figure 7 is a detailed vertical section of the machine taken on line VII—VII of Figure 3 and illustrating the sausage twisting mechanisms.

Figure 8 is an enlarged fragmentary side elevation taken on line VIII—VIII of Figure 7 and illustrating the ratchet and gear mechanisms governing the sausage twisting mechanisms.

Figure 9 is a sectional view taken on line IX—IX of Figure 8.

Figure 10 is a sectional view through the sausage meat control valve mechanism taken on line X—X of Figure 1.

Figure 11 is an enlarged transverse section of the rotatable sausage casing-supporting nozzle taken on line XI—XI of Figure 3.

Figure 12 is a developed view of the cam groove cylinder controlling the operation of the twisting mechanisms.

As shown on the drawings:

The reference numeral 1 indicates a sausage meat supply tank or container connected with a source of compressed air, for the purpose of forcing sausage meat under pressure through an outlet pipe 2 connected with the upper end thereof and having the outer end thereof connected with an improved sausage linking machine embodying the principles of this invention, which is supported upon a bracket 3 secured to one side of the sausage meat supply tank 1.

Secured on the outer end of the sausage meat supply pipe 2 is a flanged coupler 4, held in place by a retaining nut 5. The flanged coupler 4 is rigidly bolted or otherwise secured to the flange 6, which is integrally formed on one end of a sausage meat control block or valve housing 7, having an opening in the top thereof which is closed by means of a closure plate 8, which is bolted in place. The sides of the valve housing are closed by side plates 9. Integrally formed on one end of the valve housing 7 is a pipe extension 10, having a restricted sausage meat supply passage 11 therein which continues axially through the entire valve housing 7 and terminates in an enlarged funnel-shaped entrance passage 12, the outer end of which registers with the opening in the coupler casting 4 mounted on the outer end of the pipe 2 leading to the supply tank 1.

The valve housing 7 is drilled transversely at right angles to afford cylindrical valve seats 13 and 14. Rotatably mounted in the valve seat 13 is a cylindrical valve 15, having a stub shaft 16 integrally formed on one end thereof and extended outwardly through one of the valve housing side plates 9. A handle 17 is engaged on the projected end of the stub shaft 16 to permit said valve to be manually adjusted to open or close the sausage meat supply passage 11 when necessary. The manual control valve 15 is provided with a transverse passage 18 adapted, when the valve 15 is in open position, to register with the passage 11 in the valve housing 7, as illustrated in Figure 3. Rotatably mounted within the valve seat 14 is a sausage meat shut-off or control valve 19, having a transverse passage 20 adapted, when the valve is in open position, to register with the valve housing passage 11 to permit a supply of sausage meat to be forced through the valve housing passage 11 and through the open manually controlled valve 15.

Integrally formed on one end of the automatic control valve 19 is a valve stem 21, on the outer end of which a crank arm 22 is rigidly secured. Pivotally attached to the outer end of the crank arm 22 by means of a pivot bolt 23 and a forked connector 24 is the upper end of an eccentric connecting rod 25. The lower end of the eccentric connecting rod 25 is secured to an eccentric ring 26, which is engaged around an eccentric disc or cam plate 27 eccentrically engaged on a driving shaft 28 to receive a drive therefrom. The driving shaft 28 is journalled in suitable bearings provided in the side walls of a casing or box 29, which is rigidly supported upon the bracket 3 or upon any other suitable means provided adjacent the sausage meat supply tank 1. One end of the driving shaft 28 projects out of the casing 29 and is adapted to be connected to receive a drive from a motor or any other suitable source of power to cause operation of the sausage stuffing and linking machine.

Rigidly secured on the driving shaft 28 to the inside of the eccentric disc 27 is a sausage clamp control cam 30. Coacting with the cam 30 is a bell-crank arm 31, the upper end of which is integrally formed on a bell-crank sleeve 32, pivotally supported on a pin or bolt 33, secured at right angles to an inclined bracket or arm 34, rigidly bolted to the front side of the casing 29. Integrally formed on the opposite end of the bell-crank sleeve 32 is an upper bell-crank arm 35, provided at its upper end with a tapered head 36. Connected to the bell-crank arm 31 is the lower end of a coil spring 37, the upper end of which is secured to a projection 38 fastened on the inner face of the front wall of the casing 29.

The tapered head 36 on the upper end of the bell-crank arm 35 is positioned to co-act with a pair of short arms 39 which are integrally formed with a pair of long curved tongs 40. The tong members 39—40 are pivotally mounted on a pivot bolt or pin 41, which is rigidly secured on the upper end of the bracket 34. Secured on the end of each of the tong arms 40 is an outwardly projecting sleeve 42 having slidably mounted therein a stem or pin 43, on the lower end of which a sausage clamping plate or shield 44 is secured. Each of the sausage clamping shields 44 has a concave shape and the margins thereof slightly curled or bent outwardly, so that no sharp edges will come in contact with the stuffed sausage casing. Engaged around each of the slidable clamp stems 43 between the end of the tong arm 40 and the back of the clamping shield 44 is a coiled spring 45, provided for the purpose of permitting the clamping shield, when moved into a clamping position, to resiliently engage or contact a stuffed sausage to hold the same during a twisting operation of the end of the sausage casing as hereinafter more fully described.

The two oppositely positioned sausage holding shields 44 are positioned above a concave sausage holding trough 46, the margins of which are curled outwardly so that no sharp edges will come in contact with the stuffed sausage casing when supported in said holder. The sausage holder 46 is supported on an upright rod or pedestal 47, mounted upon the upper end of the bracket 34. Connecting the two pivoted tong arms 40 is a control spring 48, which acts to normally hold the upper sausage clamping shields or holders 44 in resilient clamping or holding position upon the upper portion of a stuffed sausage 49 when the same is supported in the sausage holder 46.

Connected to or formed on the outer end of the lower sausage holder or trough 46 is a sausage discharge chute 50, through which a chain of linked sausages 49 is adapted to travel when being discharged from the machine.

Integrally formed on the valve housing extension 10 is a casting or box 51, having an open chamber 52 therein and a slot 53 in the bottom thereof. An axial passage is provided in the box 51 and connects up with the restricted passage 11 of the valve housing extension 10. One end of the box 51 is provided with a reduced neck 54 which projects outwardly through an opening in the machine casing 29.

Projecting into the outer end of the box 51 and having threaded engagement with the neck 54 is a flanged bushing 55 having rotatably journalled therein a sausage meat supply tube or sleeve 56 which projects through the bushing 55 and through the chamber 52 within the box 51, as clearly illustrated in Figure 3. Projecting into the inner end of the sleeve 56 is a tube 57, the inner end of which projects into the reduced end of the sausage meat supply passage 11 of the valve housing extension 10.

Engaged on the outer projecting end of the rotatable sausage meat supply sleeve 56 and abutting against a stop flange 58 formed on said sleeve is the enlarged end 59 of a sausage casing-receiving pipe or nozzle 60, the exterior surface of the outer end of which is provided with a plurality of longitudinally disposed flat surfaces 61, as illustrated in the detailed section of the nozzle shown in Figure 11. The flat surfaces 61 on the nozzle 60 are provided for the purpose of holding a sausage casing against rotation with respect to the nozzle 60 during a twisting operation of the sausage casing.

Keyed or otherwise secured on the inner end of the sleeve 56 within the box chamber 52 is a ratchet 62 with which a spring-controlled pawl 63 co-acts. The pawl 63 is pivotally mounted upon a pin 64 supported upon the top of the box 51 and having a control spring 65 engaged thereon, and connected to the pawl 63 and to the box 51. Freely mounted on the sleeve 56 within the box chamber 52 and adjacent the ratchet 62 is a gear 66 with which the beveled end of a control latch or dog 67 is adapted to co-act to cause rotation of the ratchet 62 and the nozzle 60 in one direction with a rotation of the gear 66. The beveled latch 67 is supported on a spring 68 secured on a screw or pin 69 engaged in one side of the ratchet 62. The ratchet 62 is grooved as shown in Figure 8 to receive the spring 68 and the latch 67 therein, with the beveled end of the latch projecting into a co-acting relation with the spaces between the teeth of the gear 66.

Co-acting with the gear 66 is a gear segment 70, which is pivotally mounted on a stub shaft 71, supported in the front wall of the casing 29. Integrally formed at the junction of the spokes of the gear segment 70 is a Y extension or arm 72, provided with a longitudinal slot 73 near the outer end thereof, as clearly illustrated in Figure 7.

Rigidly secured upon the lower portion of the inner face of the front wall of the casing 29 is a T-slotted guide box 74, in the T-slot of which a guide block 75 is slidably engaged. Secured to the guide block 75 and projecting outwardly from the guide box 74 is a pin 76 which projects through the slot 73 in the gear segment arm 72. Engaged on the pin 76 and projecting through the slot 73 and the gear segment arm 72 is a rotatable sleeve 77, to the outside of which a roller 78 is positioned. The roller 78 is engaged on the outer end of the guide block pin 76 and operates in a cam groove 79, provided in the peripheral surface of a cylindrical cam 80, which is secured on the driving shaft 28 within the casing 29.

The cam cylinder 80 is so formed that rotation thereof by the shaft 28 will cause the guide block 75 to reciprocate in the guide box 74 thereby causing the roller sleeve 77 to actuate the gear segment arm 72 to reciprocate the gear segment 70 to alternately cause rotation of the gear 66 in opposite directions, so that during one direction of rotation of the gear 66 the latching dog 67 will remain in latching engagement with said gear to cause rotation of the ratchet 62 and the sausage casing-receiving nozzle 60, so that a twisting operation of the sausage casing will be performed at a predetermined time in the operation of the forming of a sausage.

The operation is as follows:

The supply tank or container 1 is adapted to be filled with sausage meat and, when compressed air is admitted into the tank, sausage meat is forced outwardly through the outlet pipe 2 into the enlarged tapered end of the sausage meat receiving pipe 11, provided within the valve housing 7.

Normally, the manually operated sausage meat control valve 15 is moved into its open position, as illustrated in Figure 3, by means of the valve handle 17. The valve 15 is then left in its open position during the operation of the machine and may be manually closed in case of emergency when it is desired to stop the feeding of sausage meat through the valve housing 7.

At the beginning of a sausage linking operation an intestine or sausage casing 81 is slipped over the nozzle 60, as indicated in Figures 1 and 2, and the outer end of the empty sausage casing may be twisted by hand or tied with a string, to permit starting of the sausage linking operation.

The machine is now set in operation from any suitable source of driving power which is connected with the driving shaft 28, thereby causing rotation of the shaft 28 and the mechanisms mounted thereon. With the rotation of the shaft 28 the sausage meat control, or feed cam, or eccentric disc 27 is rotated within the eccentric ring 26, thereby causing the connecting rod 25 to be reciprocated to alternately open and close the automatic sausage meat control valve 19, which is mounted within the valve housing 7, as clearly illustrated in Figure 3. When the valve 19 is in the open position shown in Figure 3, a supply of sausage meat from the tank 1 is forced under pressure through the valve housing passage 11, passing through the open valves 19 and 15 and is then forced through the tube 57 and through the sausage meat supply nozzle 60 on which the sausage casing 81 is engaged. The sausage meat is thus forced out of the end of the nozzle 60 into the tied or twisted end of the sausage casing 81, thereby stuffing the end of the casing with a supply of sausage meat. As the sausage casing is thus filled with a supply of sausage meat, the casing is thereby gradually forced off of the end of the nozzle 60 to partially form a sausage, which is adapted to be conducted onto the sausage holding trough 46.

At this stage in the operation the clamp control cam 30 on the shaft 28 co-acts with the lower bell-crank arm 31 to swing the same downwardly, thereby causing the upper bell-crank arm 35 to swing upwardly to move the tapered head 36 thereof upwardly between the short tong arms 39, thereby swinging said arms outwardly away from one another to cause the long tong arms 40 to move outwardly away from one another against the action of the control spring 48. The two upper sausage clamps or holders 44 are thus moved into an open position to permit the partially formed sausage to be moved into position upon the lower sausage holder or trough 46. When the set-off portion of the cam 30 passes over the end of the lower bell-crank arm 31, the spring 37 acts to pull the bell-crank arm upwardly against the reduced portion of the cam 30, thereby causing the upper bell-crank arm 35 to swing downwardly, withdrawing the tapered head 36 from between the tong arms 39, allowing the tensioned spring 48 to automatically draw the long tong arms 40 toward one another, thereby moving the upper or auxiliary sausage holders 44 into resilient engagement with the partially formed sausage on the lower holder or trough 46. The holders 44 and 46 are so shaped that no sharp edges of said holders come in contact with the casing of the partially formed sausage, so that injury to the partially formed sausage is obviated. The auxiliary or upper sausage holders engage the upper portion of the partially formed sausage and hold said sausage in a clamped position against rotation.

At this stage in the operation the twisting mechanism control cam 80 is so positioned that the rotation of said cam 80 will cause the guide block 75 to slide in the guide box 74 to cause the cylindrical roller 77 to swing the gear segment arm 72 in a direction to cause the gear segment 70 to drive or rotate the gear 66 a plurality of times, with the latching dog 67 in the position shown in Figure 8, so that the ratchet 62 is permitted to be rotated with the gear 66, with the pawl 63 slipping over said ratchet. Rotation of the ratchet 62 causes rotation of the nozzle 60 and the sausage casing engaged thereon, so that the portion of the casing at the end of the partially formed sausage is twisted a plurality of times to complete the forming of the sausage 49, which is held against rotation by the holders 44 and 46.

When the twisting operation of the sausage forming commences, the said control eccentric 27 is timed to cause the control valve 19 to be closed so that the supply or feed of sausage meat is discontinued for a predetermined period of time, during which the twisting of the sausage casing takes place.

At the completion of the twisting operation, the roller 78 engaged in the cam groove 79, is at substantially the middle portion of said cam groove, so that, with the continued rotation of the cam cylinder 80, the motion of the guide block 75 is reversed, thereby reversing the direction of operation of the gear segment 70, which, being in mesh with the gear 66, causes the same to rotate in an opposite direction against the beveled surface of the latch member 67 to slide the same outwardly into the ratchet 62 against the action of the control spring 68. With this operation it will be noted that the reverse rotation of the gear 66 will not rotate the ratchet 62 so the nozzle 60 will remain stationary during the time that the gear segment 70 moves into a position ready for the next twisting operation of the sausage casing.

The control cam 30 now acts to swing the sausage holders 44 into release or open position while the control eccentric disc 27 acts to again open the sausage meat supply valve 19 to permit an additional quantity of sausage meat to be discharged through the nozzle 60 into the twisted end of the sausage casing 81, thereby causing the end of the casing being filled with sausage meat to travel outwardly to slide the previously formed sausage out of the sausage holding trough 46 into the discharge chute 50 while the next sausage being formed is positioned upon the lower holder or trough 46.

At this point the cam 30 acts to retract the tapered head 36 from engagement with the tong arms 39, thereby causing the spring 48 to close the upper holders 44 to move the same into engagement with the partially formed sausage to hold said sausage against rotation as the next operation of the gear segment takes place to cause rotation of the gear 68 and the ratchet 62, together with the nozzle 60 and the sausage casing engaged thereon. Another twisting operation of the sausage casing now takes place to complete the forming of a second sausage of substantially the same size and weight as the one previously formed.

With the continued operation of the machine, it will thus be noted that a string or chain of linked sausages is gradually discharged from the machine through the discharge chute 50, which acts to hold the sausages against untwisting.

When the end of the sausage casing 81 has been reached, the operator may either stop the operation of the machine, or the sausage meat feed control valve may be closed by operating the handle 17 to shut off the supply of sausage meat from the tank 1 until a new sausage casing is slipped into position upon the nozzle 60.

After a string of sausages has been formed and discharged over the chute 50, the chain of sausages may be looped over sticks or tied in bunches, as desired, ready for storage or delivery.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. The combination with a sausage meat container and the outlet pipe thereof, of a sausage stuffing and linking machine removably connected with said outlet pipe and comprising a rotatable nozzle, a plurality of control valves positioned between said nozzle and the container outlet pipe, to control the flow of sausage meat from the container through the nozzle and into a sausage casing engaged on the nozzle, a stationary sausage holder, a driving shaft, an eccentric mechanism operated thereby and connected with one of said valves to alternately open and close the same to permit a predetermined quantity of sausage meat to be delivered from said container through said nozzle into the sausage casing, adjustable sausage holding mechanisms positioned to coact with said stationary sausage holder to receive the partially stuffed portion of the sausage casing, bell-crank means for actuating the same, cam controlled mechanisms operated by the driving shaft permitting the bell-crank means and the holding mechanisms to close to hold the partially formed sausage on said stationary holder against rotation, gear mechanisms connected with said nozzle, and a cam roller on said driving shaft adapted to actuate said gear mechanism to cause the same to rotate said nozzle and the sausage casing engaged thereon to twist the sausage casing adjacent the end of the partially formed sausage to complete the forming of the same.

2. The combination with a sausage meat supply pipe, of a sausage stuffing and twisting machine removably connected therewith and comprising a rotatable sausage meat outlet nozzle adapted to have a sausage casing engaged thereon, a sausage meat control valve positioned between the nozzle and said sausage meat supply pipe, a driving shaft, an eccentric disc mounted thereon, an eccentric ring engaged on said eccentric disc, a connecting rod connecting said eccentric ring with said control valve to alternately open and close said valve, to permit a predetermined quantity of sausage meat to be delivered through said nozzle into the sausage casing, a lower holder positioned at the end of the nozzle to receive the stuffed portion of the sausage casing, upper sausage holders positioned above said lower sausage holder, bell-crank means for operating the same, a cam on said driving shaft positioned to co-act with said bell-crank means to release the upper holders, resilient means for moving the upper holders into holding engagement with the sausage seated on said lower holder to hold said sausage against rotation, gear mechanisms for intermittently rotating the nozzle to cause twisting of the sausage casing to complete the forming of a sausage held between said holders, and a cam member secured on said driving shaft and co-acting with said gear mechanisms to operate the same.

3. The combination with a sausage meat supply pipe, of a sausage stuffing and twisting machine removably connected therewith and comprising a rotatable sausage meat outlet nozzle adapted to have a sausage casing engaged thereon, a sausage meat control valve positioned between said nozzle and the sausage meat supply pipe, a stationary sausage holder, a driving shaft, a crank arm connected with said control valve, an eccentric mechanism operated by said shaft and connected with said crank arm, to alternately cause opening and closing of the control valve, bell-crank actuated means controlled by the driving shaft for releasably holding a partially formed sausage on said stationary sausage holder, and a twisting mechanism operated by the driving shaft for rotating said nozzle and the sausage casing thereon to twist a portion of said casing to complete the forming of the sausage held by said stationary holder and said bell-crank actuated means.

4. The combination with a sausage meat supply member, of a sausage stuffing and twisting machine removably connected therewith and comprising a valve housing connected to the end of said sausage meat supply member, a manually controlled sausage meat control valve in said housing, an automatically controlled sausage meat supply valve in said valve housing, a sausage meat outlet nozzle rotatably supported in said valve housing, gear means for rotating said nozzle, said nozzle adapted to have a sausage casing engaged thereover, to receive the sausage meat from said nozzle when the valves in said valves housing are in open position, a driving shaft, eccentric means mounted thereon and connected with said automatic meat supply valve to automatically control the same to permit a predetermined quantity of sausage meat to be delivered through said nozzle into the sausage casing, a holder for receiving the partially filled portion of the sausage casing, clamping means positioned above said holder, resilient means for closing said clamping means to hold the sausage against rotation on said holder, a gear mechanism for rotating said nozzle and the sausage casing carried thereon to twist a portion of the casing adjacent the end of said holder to complete the forming of a sausage, a grooved cam member on said driving shaft controlling the operation of said gear mechanisms, a bell-crank mechanism co-acting with said clamping members, and a cam on said driving shaft co-acting with said bell-crank mechanism to actuate the same to cause said clamping members to be automatically opened to release the formed sausage, to permit the sausage to be moved off of said holder as an adjacent portion of the sausage casing is being filled and pushed onto said holder.

5. A sausage stuffing and twisting machine comprising a valve housing having a sausage meat supply passage therein, a manually controlled valve in said housing projecting through said passage and normally in open position, a main control valve also mounted in said housing and projecting through said sausage meat supply passage, a rotatable nozzle supported in one end of said valve housing adapted to support a sausage casing to receive sausage meat from a supply line when the main sausage meat control valve is open, a stationary sausage holder and a pair movable sausage holders positioned adjacent the end of said nozzle adapted to receive a stuffed portion of the sausage casing therebetween, spring controlled pivoted members for supporting said movable holders, means for opening said pivoted members, a gear mechanism connected with the nozzle to cause rotation thereof to twist a portion of the sausage casing after a filling operation, a driving shaft, and a plurality of cam mechanisms mounted thereon and respectively connected to the main control valve, the means for opening said pivoted members and said gear mechanisms to operate the same in a predetermined order.

6. A sausage stuffing and twisting machine comprising a valve housing having a sausage meat control passage therein, a valve in said housing for controlling the flow of sausage meat therethrough, a driving shaft, eccentric means operated by the driving shaft for controlling the operation of said valve, a nozzle rotatably projecting from said housing and adapted to receive a supply of sausage meat therefrom, said nozzle adapted to have a sausage casing engaged thereon, a sausage holder positioned at the end of said nozzle, pivoted auxiliary holders co-acting therewith, pivoted members supporting the auxiliary holders, a device for opening said auxiliary holders at a predetermined time to receive a stuffed portion of the sausage casing when the valve is open and a supply of sausage meat is stuffed into said casing, a cam on said shaft adapted to actuate said pivoted members at a predetermined time to open the same to receive the stuffed portion of the sausage casing, resilient means for closing the pivoted members to cause the auxiliary holders to hold the stuffed portion of the casing against rotation, gear and ratchet mechanisms mounted on said nozzle, a gear segment co-acting with the gear and ratchet mechanisms, a reciprocating member co-acting with said segment, a cam roller mounted on said shaft adapted to actuate said reciprocating member to cause said gear and ratchet mechanisms to rotate the nozzle at a predetermined time to twist the sausage casing adjacent the end of the filled portion of the sausage casing to complete the forming of a sausage, and resilient means connected with the sausage holder to open the same to release the formed sausage after a twisting operation and at the beginning of a new stuffing operation.

7. A sausage stuffing and twisting machine comprising a valve housing adapted to be connected with a supply source of sausage meat, a control valve in said housing, a nozzle rotatably mounted in said housing, a stationary sausage holder positioned adjacent the end of said nozzle, a sausage discharge chute connected with said sausage holder to receive linked sausages therefrom, pivotally supported auxiliary holders, a driving shaft, a cam mechanism on said driving shaft to cause opening and closing of the auxiliary holders at predetermined times, a cam drum governed by the rotation of said shaft for causing the rotation of said nozzle and twisting of a portion of a sausage casing on said nozzle at a predetermined time, and an eccentric means connecting said valve with the driving shaft to cause opening and closing of the valve at predetermined times to govern the discharge of sausage meat through said nozzle into the sausage casing.

8. A sausage stuffing and twisting machine comprising a valve housing, a sausage meat control valve mounted therein, a nozzle rotatably supported in said housing adapted to receive sausage meat therefrom, said nozzle adapted to have a sausage casing engaged thereon to receive a supply of sausage meat when said valve is open, a sausage holder for receiving a stuffed portion of the sausage casing, a driving shaft, eccentric means mounted thereon governing the operation of said valve, means for opening the sausage holder to receive a stuffed portion of the sausage casing thereon, a mechanism for rotating said nozzle, a cam device on said driving shaft for operating said mechanism at a predetermined time to rotate the nozzle and the sausage casing thereon to cause twisting of a portion of the sausage casing adjacent the stuffed portion thereof, and a cam mechanism operated by said shaft to cause automatic closing of the sausage holder to hold the stuffed portion of the sausage casing against rotation during the sausage casing twisting operation.

9. A sausage stuffing and twisting machine comprising a rotatable nozzle adapted to have a sausage casing removably engaged thereon, means for automatically controlling the flow of sausage meat through said nozzle into said casing to form sausages, control mechanisms for automatically stopping the flow of sausage meat through the nozzle and furthermore causing rotation of the nozzle to cause twisting of the sausage casing at predetermined times, a sausage holding mechanism for receiving and holding stuffed portions of sausage casing at predetermined times when twisting operations are in effect, and means for automatically causing opening and closing of the sausage holding mechanism at predetermined times.

10. A sausage stuffing and twisting machine comprising a rotatable nozzle, a driving mechanism for rotating the same, a sausage meat feed valve for supplying sausage meat to the nozzle, a driving shaft and means for operating the same, eccentric means operated by said shaft and connected with said valve to govern the operation thereof, a cam drum on said shaft for governing the operation of said nozzle driving mechanism, a sausage holder for receiving stuffed portions of the sausage casing and holding the same against rotation when said nozzle is rotated, a device for automatically opening the sausage holder at predetermined times, and a cam member on said shaft for governing the operation of said device.

11. A sausage stuffing and twisting machine comprising a sausage meat supply mechanism, a nozzle rotatably supported therein adapted to carry a sausage casing thereon, a driving shaft, means for operating the same, eccentric mechanisms operated by said shaft and connected with said sausage meat supply mechanism to control the supply of sausage meat through said nozzle and into the sausage casing, operating mechanisms connected with said nozzle, a slidable block, a pin thereon co-acting with said operating mechanism, and a cam drum operable by said shaft and engaged with said pin to actuate said operating mechanisms to twist the sausage casing after a stuffing operation thereof.

12. A sausage stuffing and twisting machine, comprising mechanisms for stuffing and twisting a sausage casing, a device for operating said mechanisms, an adjustable sausage holder for receiving and holding stuffed portions of the sausage casing against rotation during a twisting operation, and means controlled by the operation of said device to cause opening and closing of the sausage holder at predetermined times.

13. A sausage stuffing and twisting machine comprising a rotatable nozzle adapted to have a sausage casing engaged thereon, a sausage meat control valve mechanism for controlling the flow of sausage meat into said nozzle and into the sausage casing, eccentric control mechanisms for said valve mechanism, a driving shaft for operating said eccentric control mechanism, a reciprocating mechanism, a cam drum on said driving shaft for operating said reciprocating mechanism, gear mechanisms connected with said nozzle and operable by said reciprocating mechanism to cause rotation of the nozzle and twisting of the sausage casing thereon, and stationary and movable sausage holding means controlled by the operation of said driving shaft for holding stuffed portions of the sausage casing against rotation during rotating operations of said nozzle.

14. A sausage stuffing and twisting machine comprising a casing, a valve housing supported therein and provided with a sausage meat supply passage, a valve mounted in said housing, a crank arm connected with said valve, a connecting rod pivotally connected to said crank arm, an eccentric ring supported by said connecting rod, a driving shaft journalled in said casing, an eccentric disc secured on said shaft and positioned within said eccentric ring, a nozzle supported in said valve housing and projecting from said casing, said nozzle adapted to have a sausage casing engaged thereon, a ratchet secured on said nozzle, a spring control latch carried by said ratchet, a pawl co-acting with said ratchet, a gear loosely mounted on said nozzle adjacent said ratchet and in co-acting relation with said latch, a gear segment pivotally mounted in said casing and in mesh with said gear, a guide member supported in said casing, a guide block slidably mounted therein, a roller carried by said guide block and co-acting with said gear segment to reciprocate the same, a cam cylinder on said driving shaft having a cam groove therein, a roller carried by said reciprocating block and engaged in said cam groove, a bracket secured to the exterior of said casing, a sausage holder supported on said bracket adjacent the discharge end of said nozzle to receive a stuffed portion of the sausage casing thereon, tong members pivotally supported on said bracket around said sausage holder, spring-controlled clamping members mounted on said tong members, resilient means connecting said tong members and normally holding said clamping members in closed position to engage the stuffed portion of the sausage casing and hold the same against rotation upon said sausage holder, a bell-crank mechanism pivotally mounted on said bracket, a tapered head on said bell-crank mechanism positioned to co-act with said tong members to open the same and move the clamping members out of engagement with said stuffed portion of the sausage casing, and a cam on said driving shaft, co-acting with the bell-crank mechanism to operate the same.

15. In a sausage stuffing and twisting machine of the class described, the combination with a stationary sausage holder, of a pair of pivoted members, spring controlled adjustable holders carried by said members to resiliently engage and hold a sausage on said stationary holder, a spring connecting said pivoted members to normally hold the adjustable holders in clamping position, and wedge means coacting with said pivoted members to open the same against the action of said spring to move the adjustable holders into released position.

16. In a sausage stuffing and twisting machine of the class described, the combination with a stationary sausage holder, of a pair of pivoted tong members positioned to surround said stationary holder, a spring connecting said tong members, a spring controlled adjustable sausage holder mounted on each of said tong members and normally positioned to resiliently engage a sausage to hold the same on said stationary holder, a pivoted arm, a wedge member on one end thereof coacting with said tong members to cause the adjustable sausage holders to move into a released position out of engagement with a sausage on said stationary holder, a cam co-acting with said pivoted arm, and means for actuating said cam.

17. A sausage stuffing and twisting machine comprising a rotatable nozzle, means connected therewith to cause rotation thereof, a driving shaft, a cam member mounted thereon for governing the operation of said means, a valve for controlling the flow of sausage meat through said nozzle and into a sausage casing engaged on said nozzle, eccentric means on said shaft connected with said valve to operate the same at predetermined times, to permit a predetermined amount of sausage meat to be delivered into said sausage casing and move the filled portion of said casing away from said nozzle, a stationary holder, a plurality of segment shaped members for engaging the stuffed portion of the sausage casing to hold the same on said stationary holder, a wedging device for opening said holding members, a cam on said shaft for governing the operation of said wedging device, resilient means for closing said holding members after a stuffed portion of the sausage casing has been delivered to the stationary holder to hold the stuffed portion of the sausage casing against rotation while the nozzle is rotated to twist the sausage casing to finish the forming of a sausage.

In testimony whereof I have hereunto subscribed my name at Chicago, Cook County, Illinois.

FOSTER H. PARKER.